United States Patent
Herrington

(10) Patent No.: US 7,140,859 B2
(45) Date of Patent: Nov. 28, 2006

(54) APPARATUS FOR MAKING A MULTI-WALLED TUBULAR STRUCTURE

(75) Inventor: F. John Herrington, Bloomfield, NY (US)

(73) Assignee: Protens, Inc., Bloomfield, NY (US)

( * ) Notice: Subject to any disclaimer, the term of this patent is extended or adjusted under 35 U.S.C. 154(b) by 0 days.

(21) Appl. No.: 11/154,018

(22) Filed: Jun. 17, 2005

(65) Prior Publication Data

US 2005/0233019 A1    Oct. 20, 2005

Related U.S. Application Data

(62) Division of application No. 10/139,208, filed on May 7, 2002, now Pat. No. 6,955,780, which is a division of application No. 09/626,886, filed on Jul. 27, 2000, now Pat. No. 6,405,974.

(51) Int. Cl.
B29C 53/14    (2006.01)
(52) U.S. Cl. .................. 425/131.1; 425/382.2
(58) Field of Classification Search ............ 425/131.1, 425/382.3, 381.2
See application file for complete search history.

(56) References Cited

U.S. PATENT DOCUMENTS

| | | |
|---|---|---|
| 925,425 A | 10/1909 | Casler |
| 3,056,563 A | 10/1962 | Whitnah |
| 3,204,667 A | 9/1965 | Zahorski |
| 3,235,203 A | 2/1966 | Antliff |
| 3,274,315 A | 9/1966 | Kawamura |
| 3,379,221 A | 4/1968 | Harry et al. |
| 3,461,499 A | 8/1969 | Nevin et al. |
| 3,464,450 A | 9/1969 | Steffernini |
| 3,495,628 A | 2/1970 | Boender |
| 3,627,221 A | 12/1971 | Nichols et al. |

(Continued)

FOREIGN PATENT DOCUMENTS

DE    39 27 569 A1    2/1991

(Continued)

Primary Examiner—Joseph S. Del Sole
(74) Attorney, Agent, or Firm—Michael G. Gilman

(57) ABSTRACT

This specification describes an apparatus for carrying out a method of making a multi-walled pipe in the shape of a tube having a helical configuration. The apparatus is made up of an extruder with multiple dies. These multiple dies include at least two concentric arcuate dies that are radially spaced apart and a plurality of relatively straight dies that radially connect the concentric arcuate dies. The apparatus includes means for cooling the extrudate to solidify it into a usable condition. Means are provided to cause the multi-wall pipe to have a helical configuration, that is, apparatus is provided that arranges the pipe as a whole into a structure that has a circumferential component and a longitudinal component to its orientation; e.g. a helix. The longitudinal orientation is accomplished by providing apparatus that causes the pipe to proceed downstream in the direction of its longitudinal axis. In one embodiment of this invention, the extrudate is pulled longitudinally down stream. The circumferential component of the orientation of the multi-walled pipe can be accomplished by either one of two apparatus elements. First, the extrudate can be twisted (that is rotated circumferentially while it is being pulled down stream). This can be accomplished with a single piece of apparatus as shown. Thus, a longitudinal and a circumferential movement can be applied to the molten extrudate by twisting the solidified extrudate downstream of the cooling apparatus. This same configuration can be accomplished by extruding the multi-walled pipe through rotating dies whereby the extrudate is given a circumferential orientation even before it emerges from the extruder die and the circumferentially rotated pipe can then be longitudinally pulled downstream.

13 Claims, 8 Drawing Sheets

U.S. PATENT DOCUMENTS

| | | |
|---|---|---|
| 3,670,772 A | 6/1972 | Ziemek et al. |
| 3,840,194 A | 10/1974 | Vetter |
| 3,926,223 A | 12/1975 | Petzetakis |
| 4,025,675 A | 5/1977 | Jomda |
| 4,181,486 A | 1/1980 | Saito |
| 4,377,545 A | 3/1983 | Hornbeck |
| 4,432,485 A | 2/1984 | Smith |
| 4,461,323 A | 7/1984 | Morikawa et al. |
| 4,509,447 A | 4/1985 | Smith |
| 4,689,174 A | 8/1987 | Lupke |
| 4,906,496 A | 3/1990 | Hosono et al. |
| 4,919,358 A | 4/1990 | Innocenti, Sr. et al. |
| 5,047,193 A | 9/1991 | Rinkewich |
| 5,127,441 A | 7/1992 | Rains |
| 5,423,353 A | 6/1995 | Sorensen |
| 5,433,252 A | 7/1995 | Wolf et al. |
| 5,536,461 A | 7/1996 | King et al. |
| 5,580,622 A | 12/1996 | Lockshaw et al. |
| 5,639,408 A | 6/1997 | King et al. |
| 5,639,409 A | 6/1997 | van Muiden |
| 5,996,643 A | 12/1999 | Stonitsch |
| 6,102,326 A | 8/2000 | Liepold et al. |
| 2004/0187946 A1* | 9/2004 | Herrington .................. 138/112 |

FOREIGN PATENT DOCUMENTS

| | | |
|---|---|---|
| DE | 39 39 714 A1 | 6/1991 |
| EP | 0781 642 A1 | 2/1997 |
| GB | 1000809 | 11/1961 |
| GB | 1432291 | 1/1974 |
| WO | WO/91/11012 | 7/1991 |
| WO | WO/00/09317 | 2/2000 |

* cited by examiner

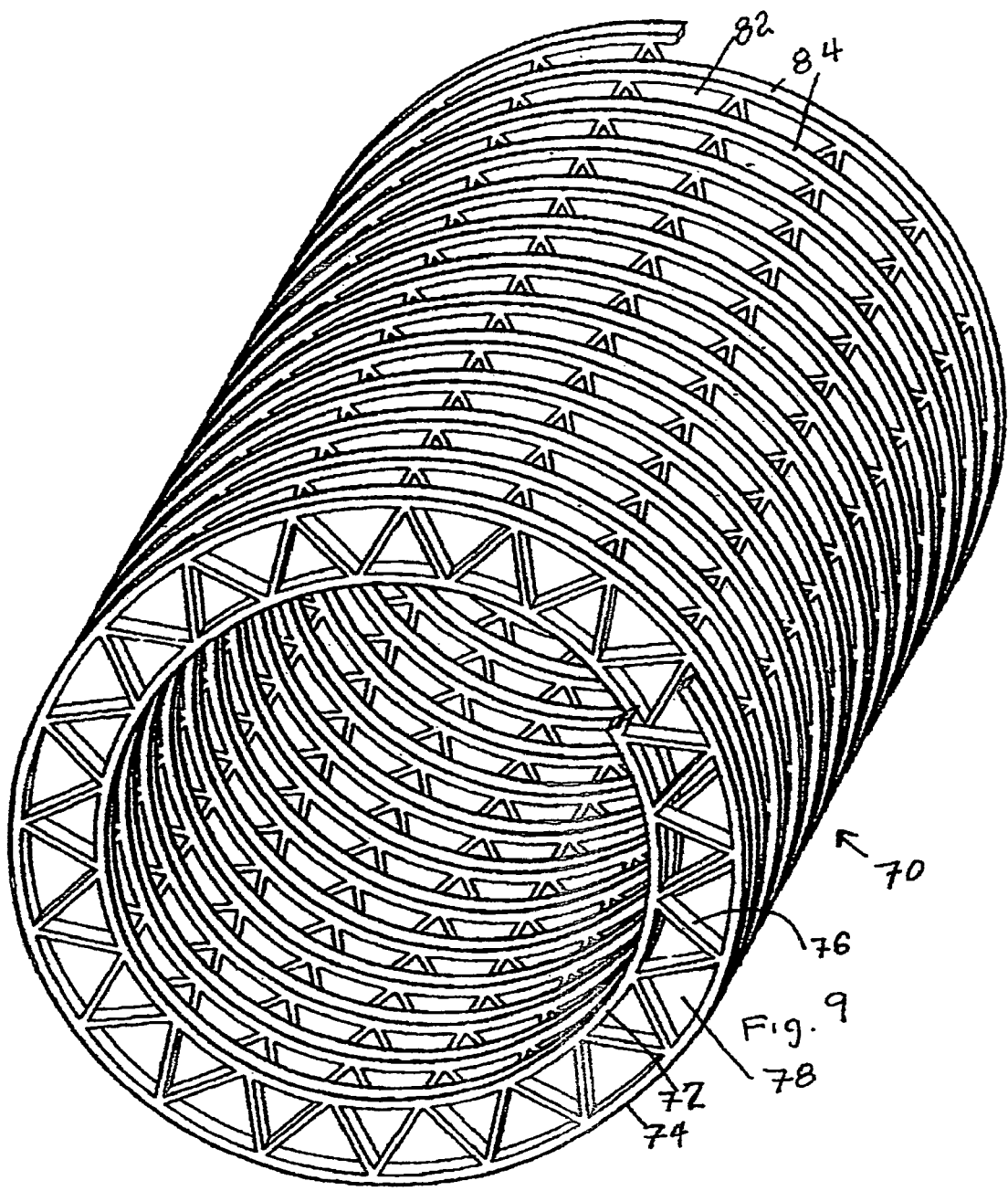

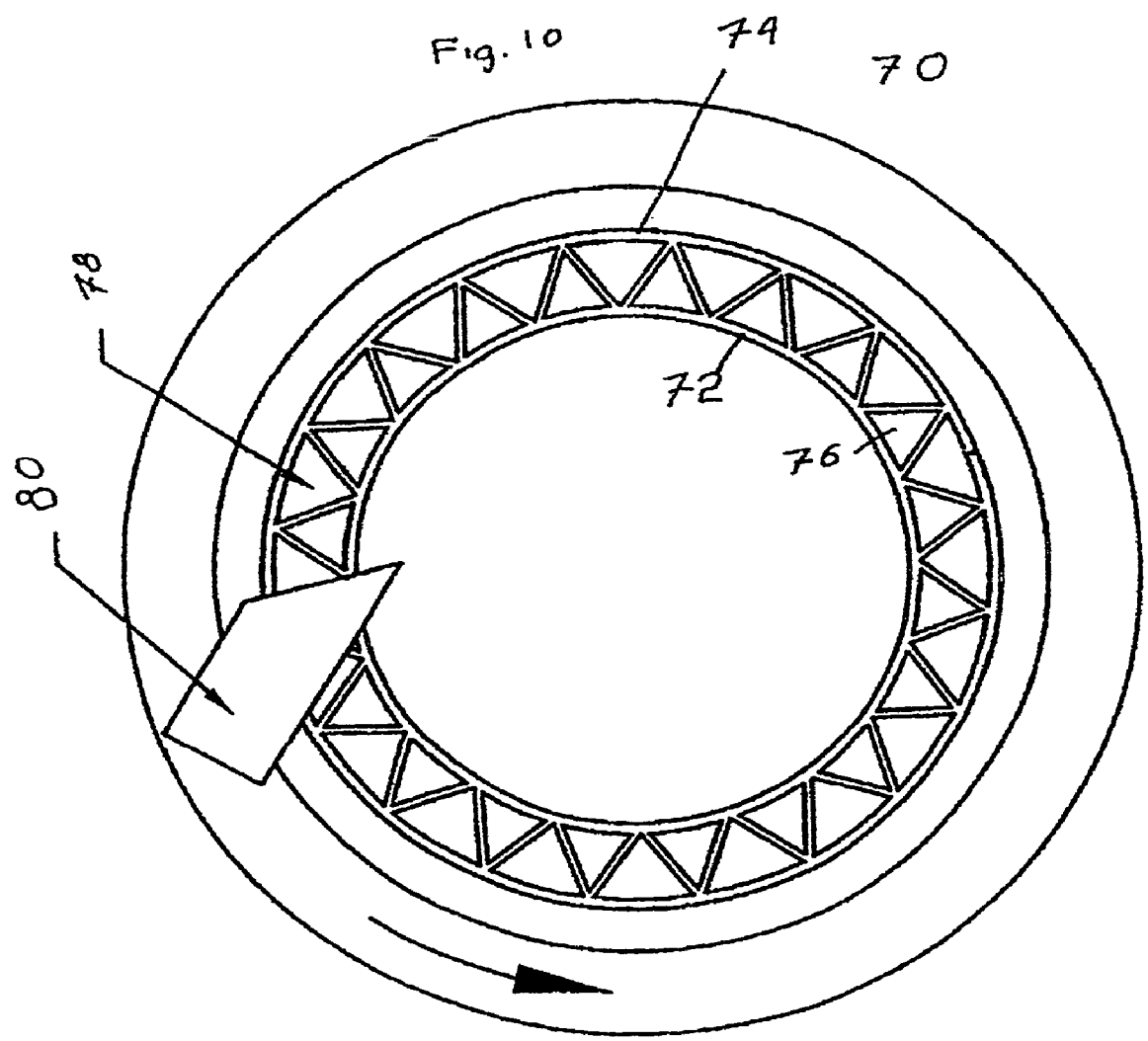

APPARATUS FOR MAKING A MULTI-WALLED TUBULAR STRUCTURE

This application is a division of U.S. application Ser. No. 10/139,208 filed May 7, 2002, now U.S. Pat. No. 6,955,780; which is a division of U.S. application Ser. No. 09/626,886 filed Jul. 27, 2000, now U.S. Pat. No. 6,405,974 which is derived from PCT application PCT/US99/17172 filed Jul. 29, 1999, which is derived from U.S. applications Ser. Nos. 60/096,237 filed Aug. 12, 1998 and 60/101,935 filed Sep. 25, 1998; all of which are incorporated herein by reference.

GENERAL FIELD OF THE INVENTION

This invention relates to generally tubular articles such as cores for rolled goods like carpets and plastic film. It more particularly refers to such cores that are light in weight and have unusually high crush resistance. It further relates to decorative toy articles made from such tabular articles.

BACKGROUND OF THE INVENTION

Cores for all kinds of rolled goods, such as plastic film, carpeting, paper products, and the like, are well known. In many instances, these cores are simply hollow cylindrical rolls of cardboard or other materials. In other cases, these cores may be solid plastic, wood or metal rods.

In one very old patent, U.S. Pat. No. 3,627,221, there is described a decorative end plug for rolled paper, such as newsprint. The end plug is made up of a centrally located opening for receiving an axially disposed shaft, a generally flat, solid, disc like portion 16 disposed radially about the shaft receiving axial opening 18, and a peripheral rim portion 20 disposed radially around the disc portion 16. From a consideration of FIG. 1 of this patent, it appears that a core 12 of the paper roll 10 is intended to fit about the rim portion 20. Put another way, the described end plug is intended to fit within the core of the roll of paper and the shaft (unnumbered) that will support the assembly is intended to pass through the axial opening 18 in the end plug.

The peripheral rim portion 20 of this disclosed end plug appears to be composed of a "U" shaped member that is made up of two concentric elements 26 and 30 that form the arms of the "U". A series of webs 34 and 36 appear to span the top of the "U". These webs and the arms of the "U" are so arranged as to form generally triangular areas or cells 38. This end plug is intended to help to support the ends of the paper roll on its cylindrical paper core. The depicted end plug is generally flat in cross section and is not disclosed to pass axially all the way through the paper roll or its cylindrical paper core. In fact, this end plug is characterized by having a diameter that is substantially larger than its depth, that is, it is a disk-like shape rather than a tube-like shape. The end plug is said to taper inwardly in thickness from its periphery toward the central opening in order to increase its resiliency during its insertion into the end of the paper roll. The '221 patent says that the depicted flat, disc like end cap may be made of molded plastic, such as polyethylene. It is clear that the depicted end cap is not suited to have paper or other flat goods rolled up on it, but is only suited to be inserted into the end of an already made roll of paper or the like. Despite the support that the end plug of the '221 patent may give to the ends of the internal tubular paper central tube, the paper core 12 must be self supporting and able to withstand the weight of the paper rolled thereon over substantially the whole of its length.

It is to be noted that the '221 patent states that the disclosed end plug is intended to help protect the already made roll from damage during loading and unloading and during transit, not during the making of the roll of paper. This distinguishes that end plug of the prior art from the core structure of the instant invention which is intended for use in creating the roll of flat goods, especially stretch or shrink wrap plastic film (hereafter generally referred to as shrink wrap plastic film). The crush stress that is applied to the core by shrink wrap plastic film is substantially greater that what is applied by newsprint, and this stress increases with the amount of shrink wrap film that is wound on the central core. It increases further with the shrinkability of the film being wound and with the speed of winding of the film. Therefore, modern wrapping techniques use solid cores to support most industrial sized rolling of flat goods, from carpet to plastic film.

Solid wood plastic or steel rollers are quite heavy and add to the shipping costs of the material rolled on them. Further, solid cores of these materials are expensive and, although efforts at recycling have been attempted, they have not met with great success. The cost of the cores must then be added to the cost of the material that is wrapped on the cores. It is obvious that making the cores hollow and thin walled will substantially reduce their weight, and therefore their cost, and will also reduce the weight of the entire rolled product whereby reducing shipping costs as well. The problem with using hollow cores, however, is that hollow tubes necessarily have lower crush strength than solid cylinders of the same diameter and material. Further, and the thinner the walls of hollow cores, the less is their crush resistance. It has therefore been thought that the tradeoff between the weight and cost of the core and the crush strength of the core was just something the art had to accept, with the proper core selected for each application.

OBJECTS AND DESCRIPTION OF THE INVENTION

It is an important object of this invention to provide a hollow core tubular article, that can be used for, among other things, supporting rolled goods thereon.

It is an object of this invention to provide such a tubular article that is lighter in weight than previous similar articles, and yet has a substantially higher crush resistance than has been achieved in the past.

It is a further object of this invention to provide such a tubular article that has sufficient radial crush strength to support the stress of substantial quantities of flat goods, particularly shrink wrap plastic film, thereon.

It is another object of this invention to provide a method of making relatively inexpensive, crush resistant hollow tubes that are suited for use as cores in supporting rolled flat goods.

It is a still further object of this invention to provide novel means for improving the roundness of tubular articles, particularly hollow tubular articles that are made by an extrusion method.

It is a still further object of this invention to provide an improved method of making tubular articles of substantial length that have more consistent diameters than has been achievable in the past.

It is still another object of this invention to make a novel entertainment or toy article that is derived from the hollow tubular articles made according to this invention.

Other and additional objects of this invention will become apparent from a consideration of this entire specification, including the drawing hereof.

In accord with and fulfilling these objects, one aspect of this invention is an elongated hollow tubular article, sometimes referred to herein as a composite tube, comprising a smaller diameter inner, generally hollow, tubular element and a larger diameter outer, generally hollow tubular element with at least one web of material disposed between, and attached to, both the inner and outer elements. The intermediate web(s) of material enable the inner and outer tubes to maintain their radial spacing from each other. Preferably there are a plurality of such webs of material disposed between, and attached to, both the inner and outer elements or walls. These plural webs are suitably spaced from each other. Most preferably, these ribs or webs are substantially equidistantly spaced apart angularly (sometimes hereafter referred to as radially spaced apart ribs) within the toroidal area between the inner and the outer tubes. These plural webs or ribs are preferably disposed in locations such that at least some of them, and preferably all of them, contact, and support, the radial spacing of both the inner and outer tubes, respectively, at locations where other such ribs also contact the inner and outer walls respectively. Put another way, each rib contacts the inner and outer tube and at the same time contacts, or at least is close to the point where the next adjacent rib also contacts, either the inner or the outer tubular wall, respectively. In one embodiment of this invention, this configuration causes a rib to be in contact with its next adjacent rib at the same time as it is in contact with one of the inner or outer tubes whereby forming generally triangular strut-like members. In another embodiment, this configuration causes a rib to be closely adjacent to its next adjacent rib at the point where it contacts either the inner or outer tubular wall whereby forming generally trapezoidal strut-like members.

Preferably, each rib contacts both ribs that are next adjacent on each side thereof at the same time as it contacts the inner and outer tubular walls, respectively, or is at least proximate to both of these next adjacent ribs at the point where it contacts both the inner and outer walls, respectively. This structure includes a rib structure between the inner and outer tubes where each rib and its next adjacent rib, together with the wall of the tube that is enclosed by the two next adjacent ribs, defines a series of substantially triangular or trapezoidal cells formed by one tube and two ribs each. These cells are not exactly triangular in cross section because the tube wall of the cell is arcuate and therefore the cross section of the cells is only approximately triangular or trapezoidal, respectively.

It is a preference in the structure of the composite tube of this invention to slightly space the ribs apart at the points where they intersect the arcuate wall of one of the tubes. In this manner, the preferred cellular structure, having a cross section that approximates a partially spherical trapezoid, is formed. The slightly trapezoidal shape of the spacing cells has been found to be desirable and an improvement over the triangular cell cross section because, when the composite tube of this invention having generally trapezoidal cellular ribs is made by extrusion of molten plastic or metal material, an excess of the rib material does not accumulate at the point where the ribs contact the inner or outer tubular walls, respectively.

It is preferred that each rib extend the whole length of the composite tubular article of this invention, and that it contact and be adhered to and support both of the inner and outer tubes, respectively, along its entire length. However, this is not an absolute requirement. The ribs(s) may be attached to the inner and/or outer tubes at intermittent areas so long as the total amount of attachment is sufficient to accomplish the purposes of this invention, that is to maintain substantially consistent spacing between the inner and outer tubes while at the same time providing sufficient radial support to avoid the composite tube being crushed by the flat form film or sheet material wound thereon.

The rib(s) should preferably extend continuously from one end of the composite tubular structure of this invention to the other, but this is not an absolute requirement. The rib(s) may be interrupted along their length, and/or, any one or more of them may extend only part way along the entire length of the composite article. It is important that the ribs as a collective whole extend substantially the entire length of the tubular article because where there are no ribs, there is no structure to maintain the spacing between the inner and the outer tubes. Under these circumstances, the composite tubular article could be crushed and collapse, under the radial stress of the flat goods rolled thereon, whereby defeating the entire purpose of this invention.

The ribs can be generally rectangular in cross section, but this geometric shape is not an absolute requirement of this invention. The ribs may have a triangular or trapezoidal, or any other desired, cross section. Further, although it is preferred that the ribs be substantially constant in cross section and area over their entire length, the cross sectional area and/or geometry of the rib(s) may change over the length of the composite tube. The geometry and cross section may also, or alternatively, change from rib to rib, as appropriate. Any combination of these parameters is considered to be within the scope of this invention.

The preferred mode of operation of this invention is to provide a plurality of ribs substantially uniformly angularly distributed about the periphery of the outside surface of the inner tube (and consequently about the inner surface of the outer tube). The cross section of each rib is preferably the same from rib to rib and along the entire length of the ribs, and is substantially rectangular. The cells formed between the next adjacent ribs and the walls of the inner and outer tubes may be generally triangular in cross section, but are preferably all substantially trapezoidal in cross section.

It is well known that triangular shapes are the strongest structural shapes for a given weight and type of material, and that the further the structure departs from a true triangle, the less rigid and strong is the resulting shape. Therefore, the trapezoidal shapes of this embodiment of this invention give up some of their strength in exchange for lighter weight and lower cost (because of less material being used). It is therefore preferred that the length of the smaller leg of the trapezoid be no more than about 10% of the length of the longer leg of the trapezoid. Of course it will be realized that these trapezoidal legs that are being referred to here are not straight as in the real trapezoid geometric shape, but rather are segments of the arcuate walls of the inner and outer tubes. The truss sections are therefore geometric shapes that approach a trapezoid, rather than actually being an exact trapezoid.

The inner and outer walls are preferably concentric, but they may depart from absolute concentricity in that one or the other may be eccentric, that is not of circular cross section. In the alternative, the tubular walls may be out of concentricity by both of the tubular walls being of circular cross section but having centers that are not coincident. The ribs must be of such a size and shape as to follow any eccentricity that may exist. The term "concentric" will be applied to the inner and outer tubes of this invention in this specification and the claims appended hereto in this broad sense, that is sufficiently concentric to accomplish the purposes of this invention, but not necessarily absolutely concentric. The term, "concentric" should therefore not be taken as a structural limitation on the articles of this invention but rather as a description of the relationship between the walls as being inner and outer.

The inner and outer walls of the composite tubes of this invention may be the same or different, but are preferably of circular cross section. Their cross sections may be of other shapes, such as elliptical, or for that matter any shape that suits the ultimate use to which the core will be put. Of great important to the article of this invention is the disposition of longitudinal ribs between, and joining, the inner and outer tubes, and supporting each of them. The combination of the "off-radial" disposition of the longitudinal ribs (that is to form generally trapezoidal truss cells), and the inner and outer tubular walls creates a structure that withstands substantially greater crushing forces than would either the inner or the outer walls by themselves, or even a single wall having the thickness of the inner and outer tubes combined.

These above described ribbed hollow wall cylindrical cores have performed very well in tests conducted to determine their crush resistance. It has been found that the "off-radial" ribbed (trapezoidal) structure is substantially stronger and more crush resistant that a hollow wall core with only spaced radial ribs. It has been found, however that when the bi-wall composite tube of this invention is squeezed between flat plates, such as is approximated by closing the jaws of a vise, the mode of failure of the structure is a buckling of some of the inner and outer tube wall segments between the ribs (off-radial or radial) that are proximate to the jaws of the vise. The forces acting on the hollow wall cores when pressed between flat, diametrically opposed plates is to compress the outer wall of the portions of the core that are in contact with the pressure plates of the vise, and to compress the inner wall in those locations that are 90° from the points where the pressure is being applied. It is these specific inner and outer wall segments, respectively, that buckle first. Where the ribs are generally longitudinal in disposition, the wall buckling progresses all the way down the length of the composite structure of this invention between the ribs as aforesaid.

According to a most preferred aspect of this invention, therefore, the ribs are disposed in a helical pattern along the length of the toroidal space between the inner and the outer tubes. In this manner, a buckling of any one rib element, by reason of pressure being applied in the radial direction between flat plates, will not have an unimpeded longitudinal path from one end of the composite tube structure of this invention to the other. Rather, as the ribs pass helically about the hollow inner wall, they form places where they will be disposed directly in the path of the pressure being applied by the opposing flat plates as aforesaid, and will thereby act as a stop to the progression of buckling.

An unexpected advantage of composite tube of this invention, having helical ribs as aforesaid, is that they unobviously show better consistency of diametral dimension, e.g. the roundness, in the case of a circular cylindrical composite tube, as compared to composite tubes made using ribs that are merely longitudinal, and not helically disposed about the length of the composite tube, assuming the manufacturing precision is the same in both cases. In the case of helical ribbed composite tubes of this invention, these same considerations apply regardless of the cross sectional shape of the ribs, or their being radial or off-radial, as has been described herein.

The helical ribs can be disposed radially between the inner and outer walls in a position that is normal to both walls. They are preferably disposed "off-radial" so as to form helically disposed triangular or trapezoidal trusses. They can most preferably be disposed so as to form substantially trapezoidal truss shapes as aforesaid. In all of these cases, the same considerations as have been set forth above apply.

Producing helically ribbed twin walled composite tubular structures is not an easy accomplishment. Conventionally, the inner and outer tubes are extruded in a linear direction, with the inner and outer tubes being generally concentric to each other. The rib forming material is disposed by simultaneous extrusion in the same manner as in making longitudinal radial or "off-radial" ribs. Immediately upon the extrudate emerging from the extruder die, and before the extrudate has had an opportunity to harden, such as by cooling, the hollow walled composite tube is simultaneously taken away and twisted at a speed sufficient to draw down the walls to their desired final thickness as well as form the ribs into their desired helical pitch. The speed of extrusion and the speed of twisting of the extrudate must be closely coordinated to insure that the helical ribs are properly formed.

In making a product with helical ribs, it is necessary to provide relative rotation of the extruded product as it exits the die. This can be done in either of two ways: rotate the die while pulling the molten composite tube straight out in an axial direction, or keep the die stationary and rotate or twist the exiting composite tube as it is pulled away from the die. The technique of rotating the die is well known in the plastics extrusion industry and is quite applicable here. However, it has been found that the better approach is to maintain the die in a stationary condition and rotate the extruded composite tube. This can be accomplished by twisting the exiting tube to produce helical rib forms. It is preferred to accomplish this by using a novel mechanism that is described below.

The novel puller of this invention comprises a belt wound helically around the extruded tubular product. As the belt is driven, it pulls the tube downstream and simultaneously rotates it. One difficulty encountered by this operation is that the tension on the belt inherently applies sideways forces that tend to bend the tube. According to another aspect of this invention, this problem is solved by applying a second belt intertwined with the first belt, that exerts a longitudinal force in the same direction, but is out of phase with the first belt such that the sideways forces it applies to the tubular product are directly opposite to those of the first belt, effectively countering the bending forces being exerted by the first belt. This operation has the added advantage of applying a generally uniform radial squeeze so there is no flattening of the tube during pulling and twisting it.

The extrudate material may be plastic or metal. Polyethylene and polystyrene have worked well but there does not appear to be any specific limitation on the nature of the material being used to make the hollow wall cores of this invention so long as it is reasonably extrudable. The extrudability of the material is the prime consideration. Any material that extrudes well and solidified fairly rapidly, but not instantaneously, will serve as a suitable material from which to make the hollow wall composite tubes of this invention. If needed, auxiliary heat may be applied to maintain the extruded composite tube at the proper temperature to permit it to be rotated to form the ribs into helices.

It is considered to be within the scope of this invention to make the inner and outer tubes of different materials, respectively. The ribs may be made of the same material as either the inner or the outer tube, or of a completely different material.

As the composite tubular structure of this invention is made, it is preferably cut into lengths, as appropriate. It may also be coiled into a substantially endless length of composite tubing as is conventional in the art. Also, as is conventionally done, the tube can be cut without stopping the extrusion by using a cutter that may be suitably mounted to a carriage that travels along with the moving tube. However, because the advancing tube is also rotating, provision must be made to have the carriage move linearly at the same linear speed as the tube, yet allow the tube to rotate relative to the carriage. One way that this can be done is by using a set of wheels on the carriage with their axes parallel to the tube axis, to clamp the tube during cutting. If it is permitted or desirable to stop the extrusion process a non-helical cutter may be used.

It has also unexpectedly been found that the composite tube of this invention is a suitable starting material from which to produce a novel toy. It has been found that it is possible to cut the composite tube of this invention about a helical path while it is being longitudinally extruded, or thereafter, with or without imparting helical twist to the ribs thereof. This novel product is an unusually decorative "slinky". If the composite tube of this invention is cut along a helical line with a relatively short flight, the resulting article has the resiliency of a spring and can be suitably stretched and/or compressed in an axial direction. This article has flights that have a cross section that includes some number of ribs that have been cut along with the rest of the composite tube. On the other hand, if the helical cutter has the same flight as the helical ribs, it is possible to make a slinky with a continuous toroidal rib. The ribs maintain the spacing between the inner and the outer tube of each fight of the cut helix. It will be clear that the direction and flight distance of the helical cut must be coordinated with the pulling and twisting forces that are being applied to the extruded tube so that there is sufficient rib material to maintain the integrity of the composite walled structure in its spring shape.

The above and the following descriptions of the instant invention in all of its aspects has been exemplified by the use of one inner and one outer wall to form the composite tubular article hereof. It should be clear that this is not a limitation on the scope of this invention, but rather is illustrative thereof. A composite tubular structure with more than two walls is contemplated by this invention, and the entire disclosure hereof should be read with this in mind.

BRIEF DESCRIPTION OF THE DRAWINGS

FIG. 9 is a perspective view of a "slinky" spring like article according to this invention; and FIG. 10 is a sectional end view of a cutter acting on the composite tube of this invention

DETAILED DESCRIPTION OF THIS INVENTION

Figure 1:
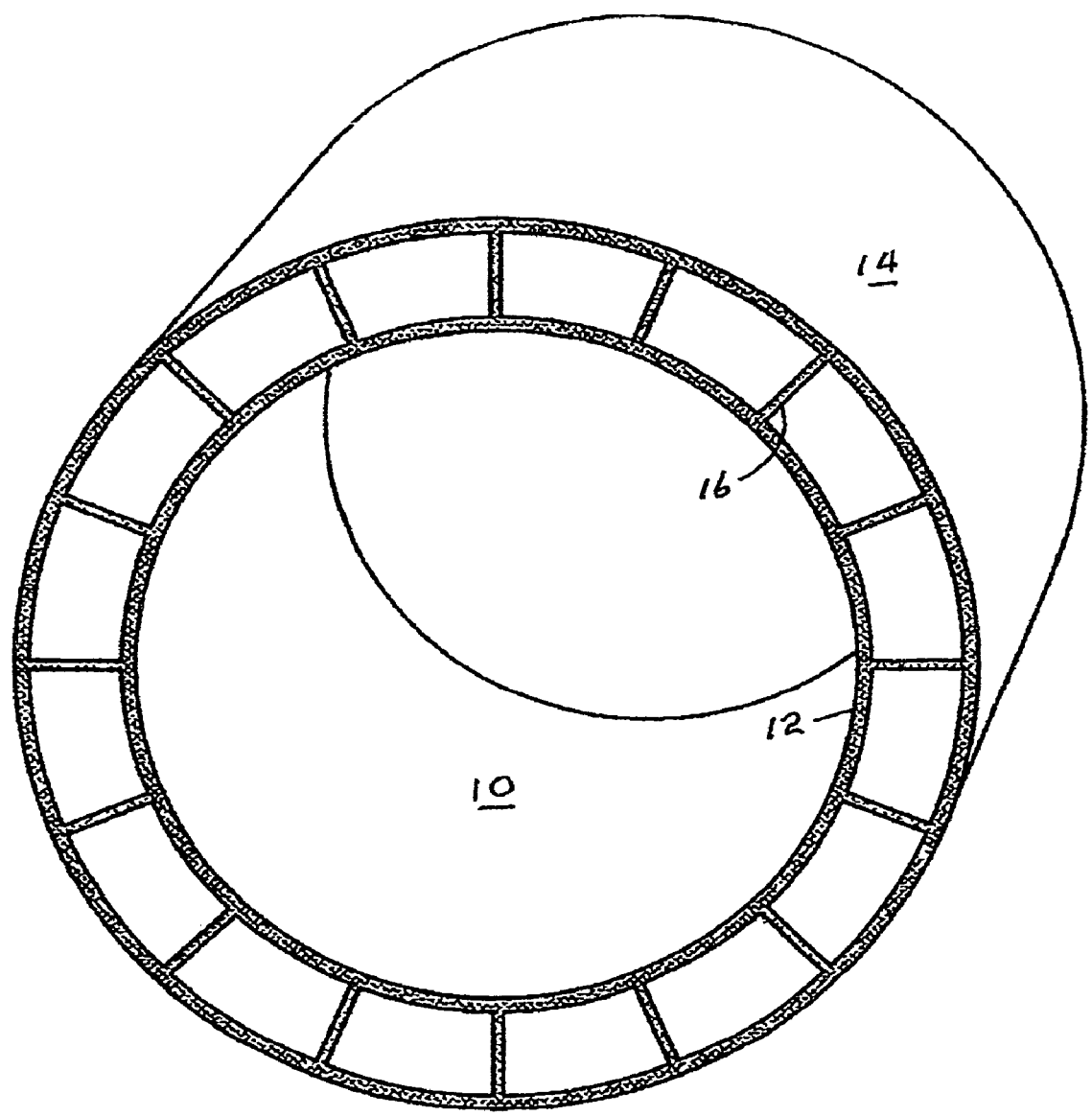
FIG. 1 is a perspective view of a hollow two walled tubular article with radial ribs.
Figure 2:
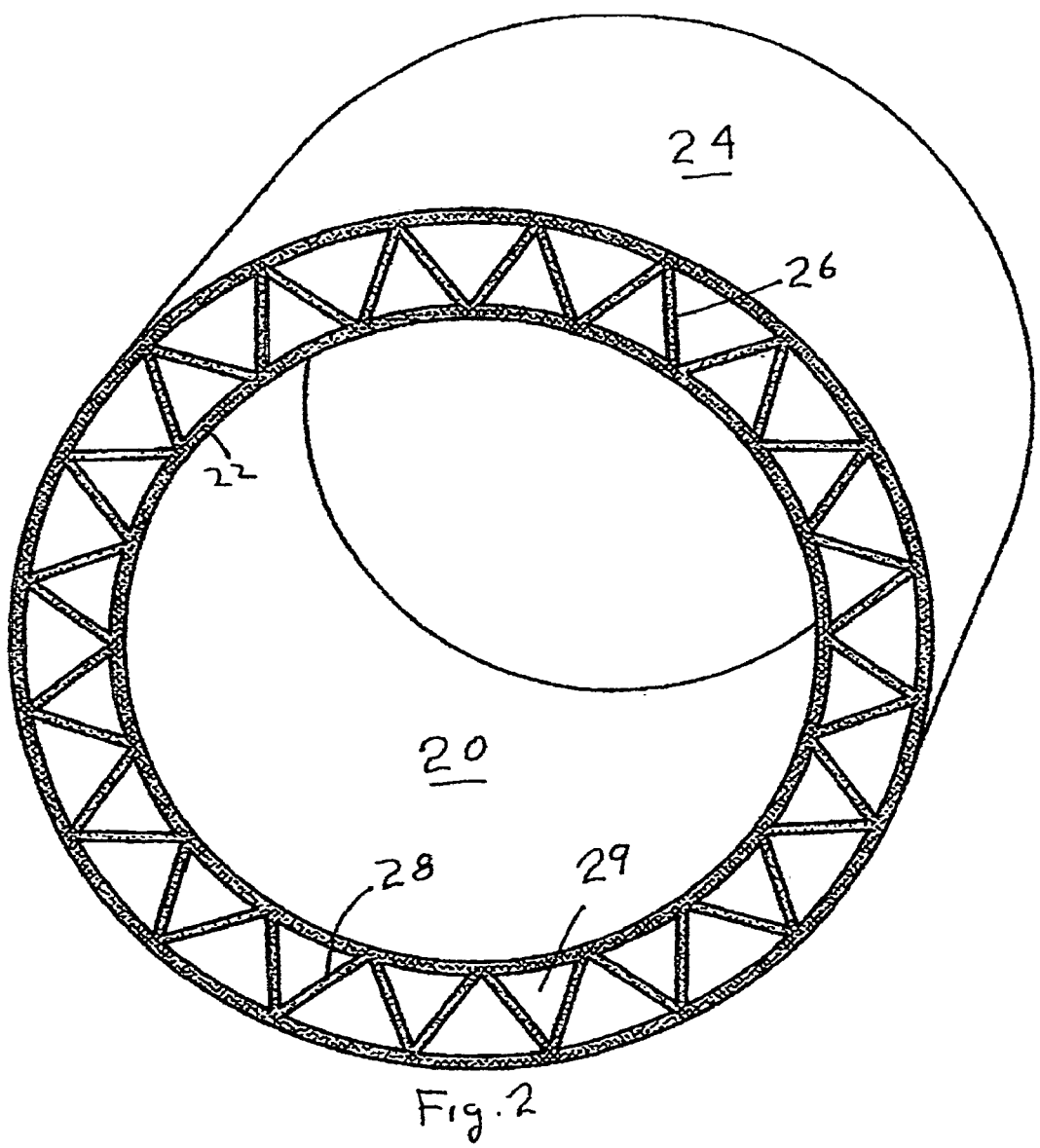
FIG. 2 is a perspective view of a hollow two walled tubular article with "off-radial" ribs forming generally triangular truss members.
Figure 4:
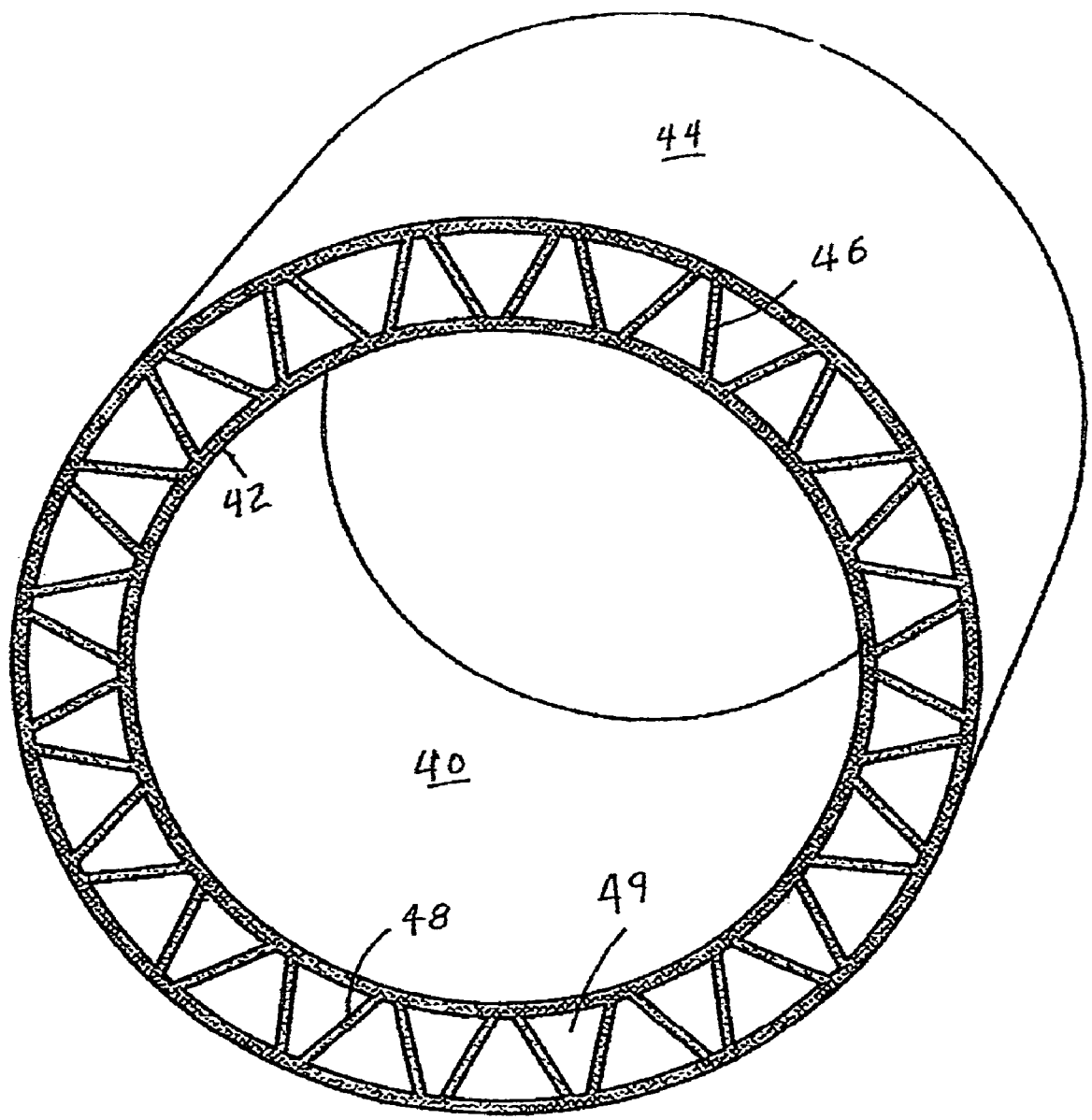
FIG. 4 is a perspective view of a hollow two walled article with "off-radial" ribs arranged to form trapezoidal truss members.

Reference will now be made to the drawing, wherein like parts have been given like reference numbers. Referring to FIG. 1, a composite tube 10 according to this invention is made up of an inner tube 12, an outer tube 14 and a plurality of ribs 16 therebetween. Referring to FIG. 2, a modified composite tube 20 of this invention is made up of an inner tube 22, and outer tube 24, a set of "left handed" "off radial" ribs 26 and an alternating set of right handed" "off-radial" ribs 28. Note that the combination of the inner tube, the outer tube and the two sets of ribs forms generally triangular truss cells 29. Referring to FIG. 4, a further modified composite tube 40 of this invention is made up of an inner tube 42, an outer tube 44, and a series of left and right handed alternating "off-radial ribs 46 and 48, respectively. Note that the left and right handed ribs contact and are joined to the inner and outer tubes, respectively, out of contact with each other. This is to be compared to the structure shown in FIG. 2 where the left and right handed ribs contact each other at the same place as they contact the inner and outer tubes, respectively. In FIG. 4, the truss cells 49 that have been created have a generally trapezoidal cross section.

Figure 3:
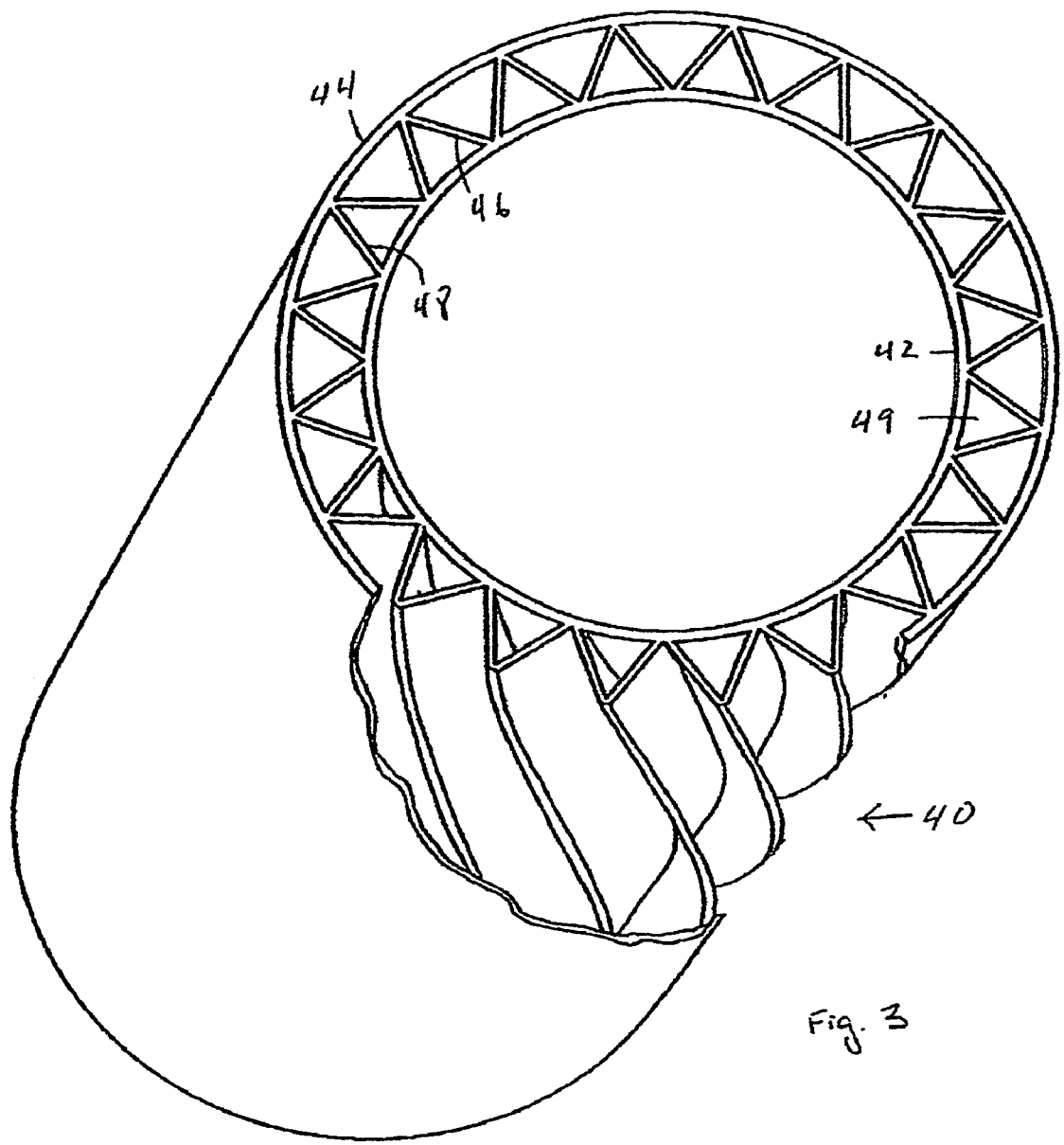
FIG. 3 is a perspective view, with portions cut away, of a hollow two walled tubular article with helically disposed "off-radial" ribs forming triangular truss members.

Referring to FIG. 3, there is shown a composite tube 40 of this invention that has a cross section that is similar to that shown in FIG. 2. The composite tube 40, whose cross section was shown in FIG. 2, has been twisted to cause the ribs 46 and 48 to have a helical form.

Figure 5:
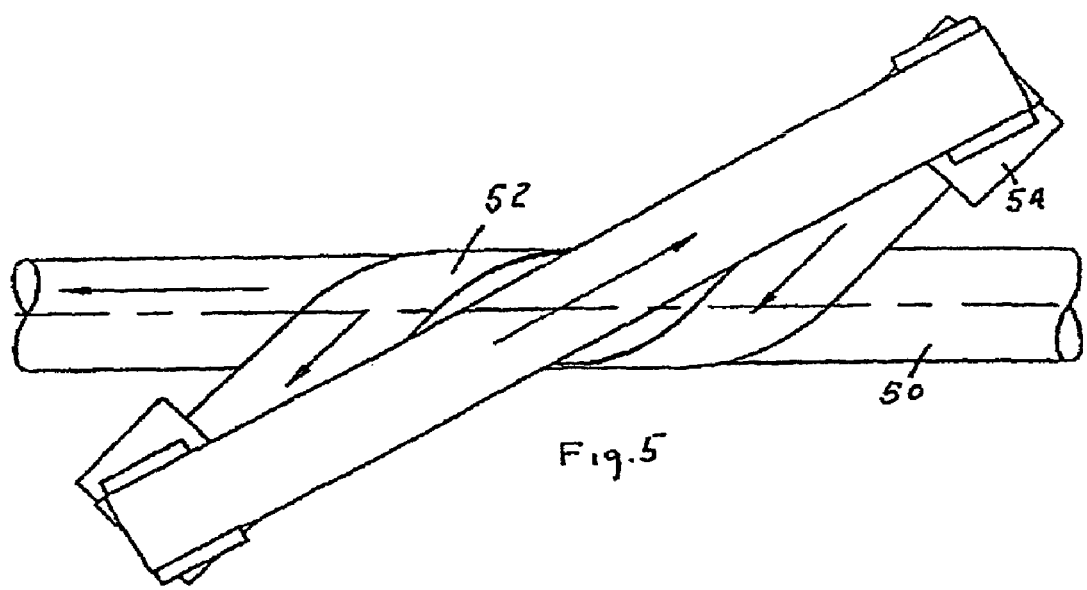
FIG. 5 is a top view of an apparatus suited to pull tubular extrusions away from the extruder and twist the same into a helical form suited to forming the product shown in FIG. 3.
Figure 6:
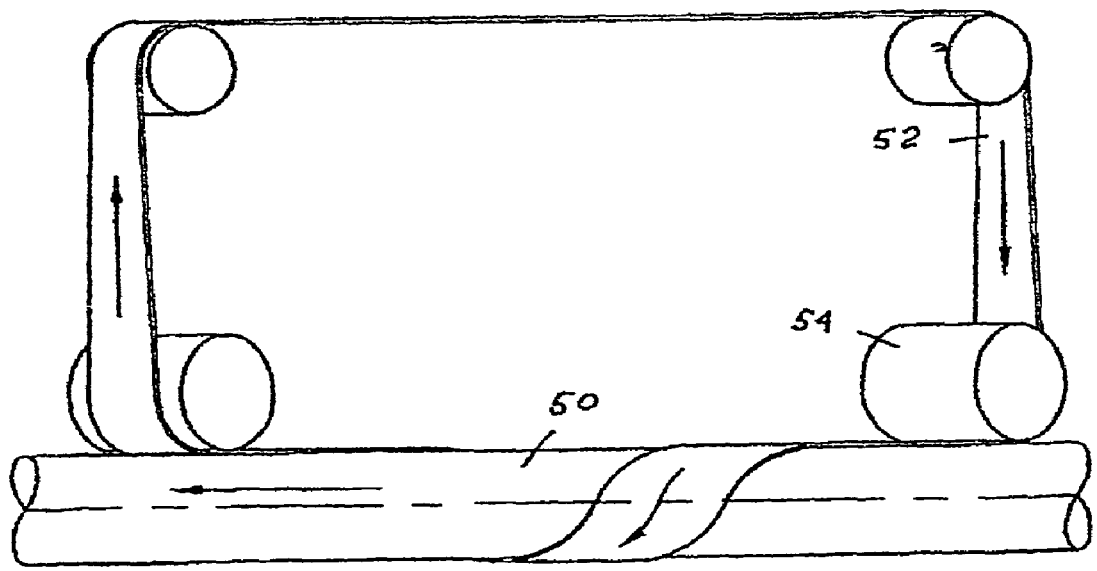
FIG. 6 is a front elevation of the apparatus shown in FIG. 5.

Referring to FIGS. 5 and 6, there is shown an apparatus for forming a composite tube having helical rib structures according to this invention. The extruded composite tube 50 is proceeding from right to left in this figure. A driven belt 52 is relatively tightly rapped around the composite tube 50 in a helical configuration, and means 54 are provided for driving the belt whereby twisting the composite tube such that the internal ribs (not shown in this figure) conform to the shape depicted in FIG. 3.

Figure 7:
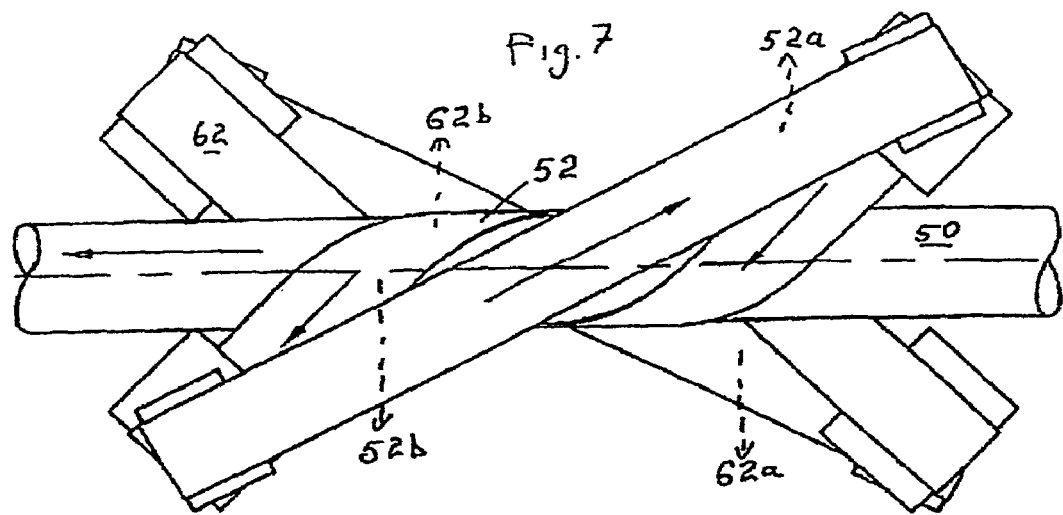
FIG. 7 is a top view of an apparatus using two intertwined pullers to pull tubular extrusions away from the extruder and twist the same into a helical form suited to forming the product shown in FIG. 3 without exerting undue sideways forces on the tube.
Figure 8:
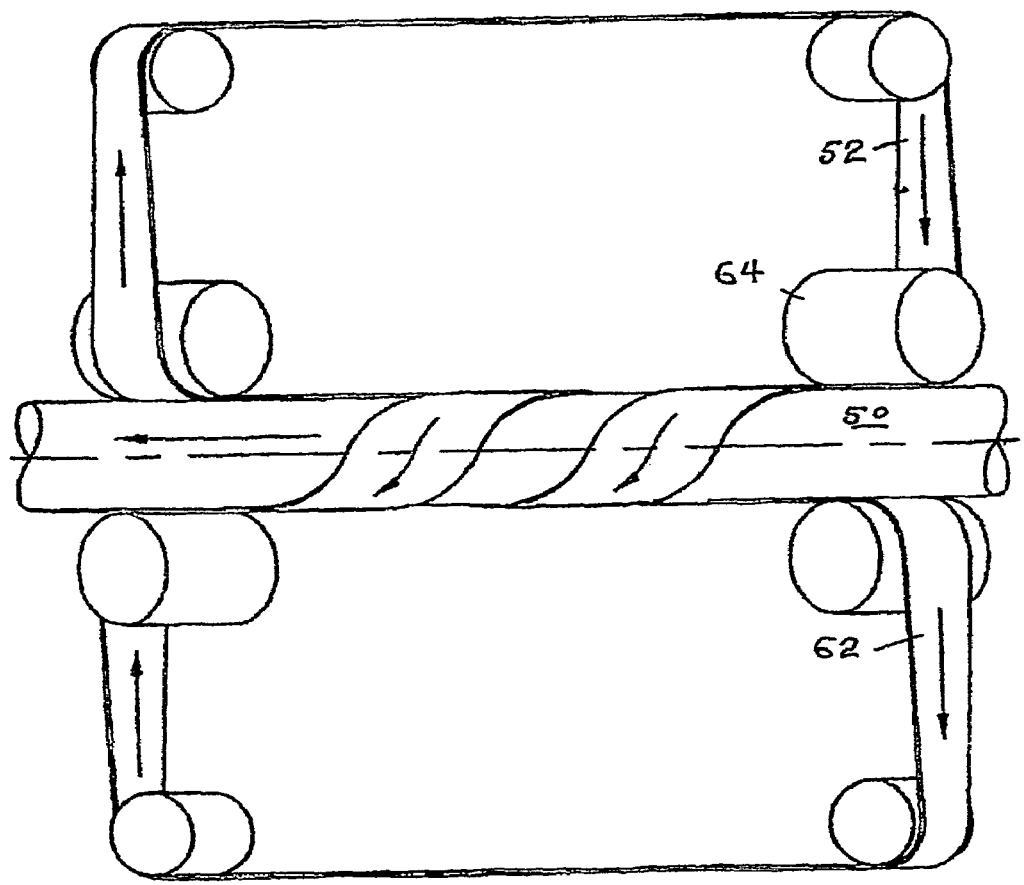
FIG. 8 is a front elevation of the apparatus shown in FIG. 7

FIGS. 7 and 8 show an apparatus that is similar to that shown in FIGS. 5 and 6 but with two intertwined belts 62 and 62, both pulling and rotating the tube 50 in the same direction. The first belt 52 exerts lateral forces 52a and 52b on the tube 50 which are axially displaced from each other, thus providing a bending moment on the tube 50. The bending forces are exactly equal and opposite to, and are thereby canceled by, the forces 62a and 62b that are being exerted by the belt 62. The result is that there is no total bending moment applied to the tube 50 by the twisting mechanism of this aspect of this invention.

The nature of the material of the driving belt is not particularly critical. Its surface should have sufficient coefficient of friction relative to the material of the extruded composite tube that it will be able to drive the tube without crushing or marring its surface. In most instances, the surface of the drive belt will be smooth so that it does not mar the surface of the composite tube. However, the driving belt may be used to impart a profiling to the surface of the composite tube.

Referring now to FIGS. 7 and 8, there is shown a novel toy that is simply made from the composite tube of this invention. This toy is akin to a "slinky" and may be formed from the composite tube of this invention regardless of the material from which the tube has been fabricated. The composite tube 70 is made up of an inside wall 72, an outside wall 74, and ribs 76 disposed in supporting relationship therebetween, and forming suitably shaped truss cells 78. The composite tube 70 is suitable helically cut, using a rotating cutter 80 so as to form a helix 82 having a plurality of flights 84. The helix can be stretched in a longitudinal directions in the same way that a spring is stretchable, but it is reasonably rigid in the transverse direction. It is possible to make the ribs and the inner and outer tubes from the same materials and in the same colors. It is preferred, however, to make these elements of different color materials so as to add to their eye appeal.

What is claim is:

1. An apparatus adapted to produce a monolithic, multi-walled tubular structure,
   wherein said structure comprises:
   at least one larger diameter outer tube;
   at least one smaller diameter inner tube, disposed substantially within the larger diameter outer tube, and
   a plurality of supporting rib struts disposed between said tubes and in supporting relationship to said tubes,
   wherein said smaller diameter inner tube, said larger diameter outer tube and said plurality of supporting struts are all collectively disposed in a configuration such that they all have circumferential and longitudinal vectors,
   wherein at least some of said struts are disposed in non-perpendicular relationship to the tubes that they support and are disposed in alternating positive and negative angles to tangents to said tubes such that two adjacent struts and the tubes that they intercept form triangular or trapezoidal truss cells;
   wherein said apparatus comprises:
   an extruder, comprising:
   at least two radially spaced apart arcuate extrusion dies, wherein said dies are adapted to extrude thermoplastic material into a molten, plastically deformable extrudate comprising: at least two radially spaced apart tubes; and
   a plurality of additional, substantially straight, extrusion dies disposed between said arcuate dies, wherein at least some of said additional extrusion dies communicate with both of said arcuate dies, wherein said additional dies are adapted to enable the extrusion of said supporting truss members disposed between and joined to said extruded tubes in the form of a monolithic extrudate structure;
   a puller adapted to assist in the movement of said monolithic extrudate structure in a downstream direction away from said extruder dies;
   a rotator adapted to rotate said molten, radially spaced apart inner and outer tubes and said plurality of truss members as a unit into a multi-wall tubular extrudate that has at least one longitudinal and at least one circumferential vector component to its shape; and
   a cooler adapted to cool said rotated extrudate to a solidified condition including freezing said monolith extrudate in a condition wherein substantially all of the elements of said frozen extrudate have a circumferential and a longitudinal component to their shape.

2. An apparatus as claimed in claim 1 wherein said cooler is disposed between said puller and said extruder dies.

3. An apparatus as claimed in claim 1 further comprising a rotator that is adapted to apply rotation to said frozen extrudate including means to translate said rotation of said frozen extrudate to rotation of said molten extrudate.

4. An apparatus as claimed in claim 3 wherein said puller and said rotator comprise a single, combined apparatus.

5. An apparatus as claimed in claim 1 wherein said puller is disposed down stream from said rotator.

6. An apparatus as claimed in claim 1 wherein said rotator is disposed upstream of said cooler and said puller is disposed downstream of said cooler.

7. An apparatus as claimed in claim 5 wherein said rotator comprises at least one arcuate extrusion die that is adapted to rotate and to thereby rotate said molten extrudate.

8. An apparatus as claimed in claim 6 wherein said rotator comprises at least two arcuate extrusion dies that are adapted to rotate and to thereby cause said molten extrudate to emerge from said extruder die(s) with a circumferential vector component.

9. An apparatus as claimed in claim 4 wherein said combined puller and rotator apparatus comprises:
   a plurality of rollers, comprising at least one entry roller and a spaced apart return roller, each being adapted to be disposed proximate to, but spaced from, said frozen tubular article;
   a belt disposed about said rollers in a condition such that said belt is adapted to be longitudinally moved by at least one of said rollers;
   wherein said belt is adapted to be angularly engaged with said frozen tubular article in a pulling and rotating relationship thereby being adapted to pull and rotate said frozen tubular article such that said pulling and rotating is translated to said molten extrudate whereby being adapted to impart longitudinal and circumferential orientation to all of said molten extrudate; and
   means to rotate at least one of said rollers.

10. An apparatus as claimed in claim 1 wherein said linear extrusion dies are oriented so as to be adapted to extrude at least some of said trusses in a position that is initially substantially normal to said tubes.

11. An apparatus as claimed in claim 1 wherein all of said linear extrusion dies are angularly disposed to normal relative to said inner tube.

12. The apparatus as claimed in claim 1 further comprising means to rotate at least one of said extrusion dies whereby to impart a circumferential vector to said extrudate: and means to linearly pull said moldable extrudate away from said extrusion dies in an axial direction whereby forming an elongated cylindrical article oriented in a composite of longitudinal and circumferential directions.

13. The apparatus as claimed in claim 1 wherein at least two of said concentric arcuate extrusion dies are adapted to be rotated and are therefore adapted to cooperate with a longitudinal puller to cause a moldable cylindrical extrudate, that is wholly oriented in a composite of longitudinal and circumferential directions, to be extruded from said extruder.

* * * * *